…

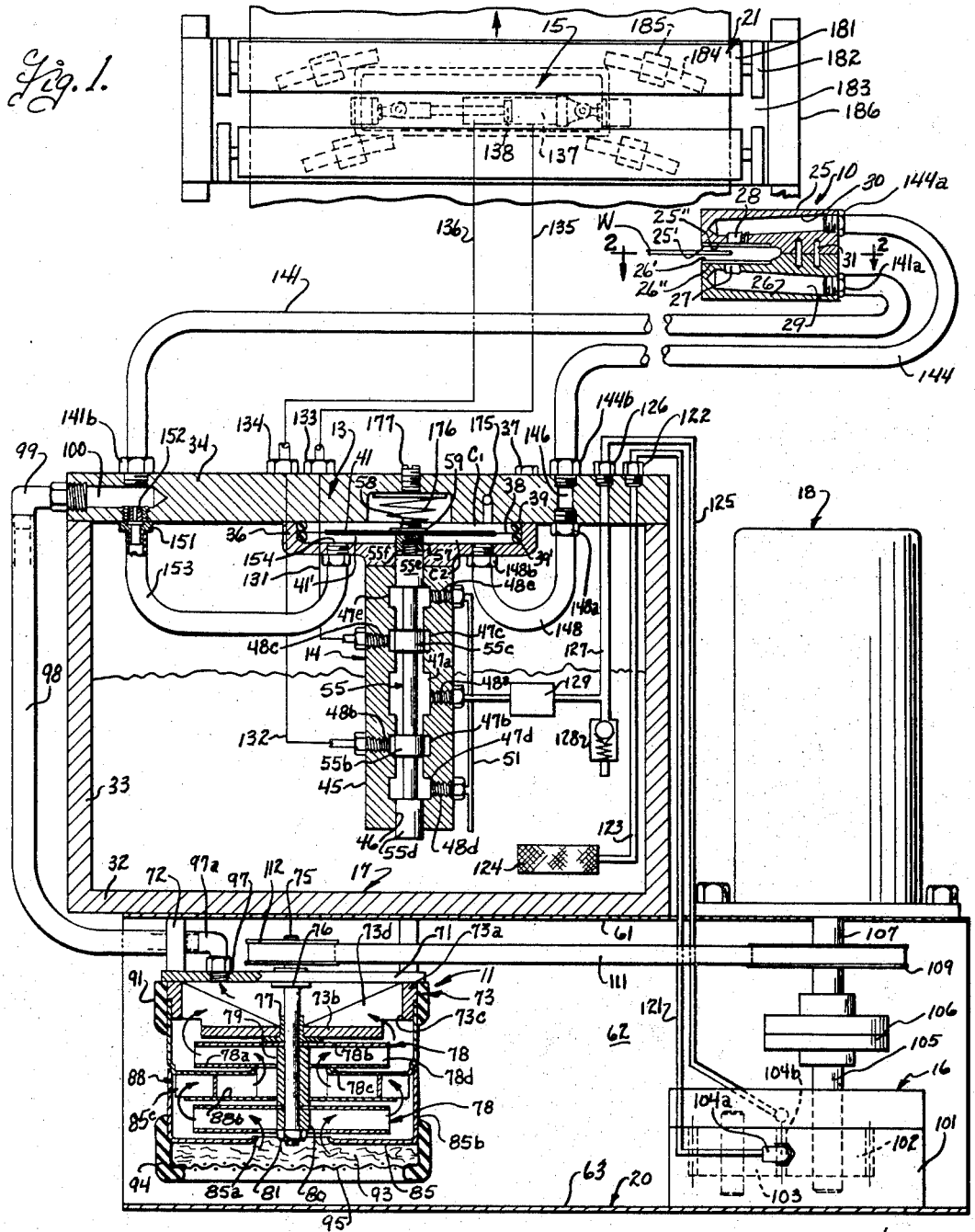

United States Patent Office 3,407,706
Patented Oct. 29, 1968

3,407,706
WEB EDGE SENSING AND CONTROL APPARATUS
Robert W. Ott, Jr., Rockford, Ill., assignor to Rockford Servo Corporation, Rockford, Ill., a corporation of Illinois
Feb. 23, 1967, Ser. No. 618,102
8 Claims. (Cl. 91—3)

ABSTRACT OF THE DISCLOSURE

Pressurized air is supplied to two orifices in a sensing head which blow opposing streams of air toward each other and across the path of travel of the web edge. The edge of the travelling web partially interrupts the reaction of these two jets of air and produces a small pressure variation which is applied to a pressure responsive actuator that operates a servovalve to control a remote servomotor.

*Background of the invention.*—Web edge sensing apparatus have heretofore been made which employed a web edge sensor that directed two opposed jets of air across the edge of a travelling web and which actuated a servovalve in accordance with the variations in the pressure produced as the web variably intersected the opposing streams of air. The pressure on the air issuing from the sensing head orifices, however, is relatively low, generally less than one p.s.i., and the pressure variations produced by the web intersecting the opposing streams of air are of an even lower order of magnitude. It is accordingly necessary to maintain the pressure supplied to the sensing head substantially constant in order to avoid production of spurious signals. Heretofore, it has been the practice to use a relatively high pressure air source, such as the plant air supply or a positive displacement piston or vane pump, and to pass the high pressure air through a pressure regulator to provide the desired low pressure air for the sensing apparatus. However, pressure regulators capable of accurately maintaining a relatively low pressure less than one p.s.i. are quite expensive to build or obtain particularly in the lower outlet pressure ranges amounting to only a fraction of one p.s.i., for example pressures in the range of about 5 to 10 inches of water column. Moreover, in the dual orifice sensing head, the flow of air from the dual orifices varies in accordance with the position of the web edge in the opposing jets of air, and this further complicates the problem of regulating the air supply to the sensing heads to maintain it constant with the variable flow.

The plant air supplies are often quite dirty and contain oil, water, scale, etc. Even in the prior system which used a high pressure air compressor separate from the usual plant supply, the air generally contained water and compressor lubricant such as oil or graphite depending on the type of compressor. It has accordingly been necessary, in the prior web sensing systems using pressurized air, to also use a downstream filter between the compressor and the web sensing apparatus to remove the foreign matter, much of which was introduced by the compressor itself. Such filters, however, become clogged in use and not only variably restrict the flow of air to the sensing apparatus but also, in the case of the separate air compressors, may eventually result in overload of the compressor drive motor.

*Summary of the invention.*—A web sensing and control apparatus having a sensing head for emitting two opposed streams of air across the edge of a travelling web and a pressure responsive actuator for detecting variations in pressure produced by a web intersecting the streams, is supplied with low pressure air from a self-contained substantially constant low pressure air generator capable of directly producing the desired constant low pressure air supply. The outlet of the constant low pressure air generator is connected to the transmitting orifice of the sensing head through a low impedance line to provide substantially unrestricted flow from the generator outlet to the transmitting orifice, and the outlet of the generator is connected to the sensing orifice through a flow restrictor so as to pass a relatively lower velocity stream of air from the sensing orifice toward the transmitting orifice. The constant low pressure air generator comprises a centrifugal air pump of a size and driven at a speed such as to produce the desired substantially constant low pressure air output, and the centrifugal air pump is capable of maintaining a substantially constant output over the varying flows encountered in operation of the dual orifice sensing head. The air delivered through the flow restrictor to the sensing orifice of the sensing head is advantageously passed through the sensing chamber of the pressure responsive actuator to improve the responsive and operation of the system. The sensing head is advantageously constructed and arranged so as to improve the linearity of response to movement of the web edge into the opposing jets of air issuing from the transmitting and sensing orifices in the head.

The centrifugal air pump employed as a constant low pressure generator eliminates the necessity of a pressure regulator in the supply and further does not introduce lubricant or cause water condensation in the air supply and so avoids the necessity of a downstream filter.

In the preferred embodiment, the sensing and control apparatus uses the pneumatic sensing apparatus for operating an hydraulic servomechanism and, advantageously, a common motor is used to drive both the hydraulic pump and the constant low pressure air generator.

In the accompanying drawings:

FIGURE 1 is a diagrammatic view of the web edge sensing and control apparatus with parts shown in section to illustrate details of construction; and FIG. 2 is a fragmentary sectional view taken on the plane 2—2 through the sensing head and illustrating one of the sensing jaws on a larger scale.

The web edge sensing and control apparatus in general includes a sensing head 10 for directing opposed streams of air toward each other and across the edge of a travelling web W; a constant low pressure generator 11 for supplying air to the sensing head at a desired low pressure; a pressure responsive actuator 13 responsive to pressure variations at the sensing head produced by the web intersecting the opposing streams of air; and a servovalve 14 operated by the actuator 13 for controlling a remote servomotor 15. The web sensing and control apparatus is of the pneumatic-hydraulic type, employing the aforedescribed pneumatic sensor with an hydraulic system for operating the servomotor and includes an hydraulic pump 16 and reservoir 17 for supplying hydraulic fluid under pressure to the servovalve and servomotor. The hydraulic pump and the constant pressure air generator are conveniently driven from a common drive motor 18, and the several instrumentalities including the motors, hydraulic pump, air pump, reservoir and valve are conveniently mounted on a common base 20. The servomotor 15 is conventionally connected to a mechanism which operates on the travelling web, for example a movable web guiding or winding roll, or an apparatus that operates on the travelling web such as a cutter or scorer.

The web sensing head 10 comprises a pair of jaws 25 and 26 having guide faces 25' and 26' spaced apart to define a throat therebetween for receiving the edge of the travelling web W. A transmitting orifice 27 is provided in one of the jaws such as the lower jaw 26 and a sensing orifice 28 is provided in the other jaw 25 in opposed relation to the transmitting orifice 27. Fluid is supplied to the transmitting and receiving orifices through passages 29 and 30 which extend generally lengthwise of the jaws from one end thereof and, preferably, the passages are inclined with respect to the axis of the jaws so that the ends thereof adjacent the respective orifices 27 and 28 are disposed relatively closer to the guide faces 26' and 25'. The transmitting and sensing orifices are preferably elongated in a direction transverse to the edge of the travelling web to improve the linearity of the response of the apparatus to the position of the web in the opposing jets of air. As best shown in FIG. 2, the transmitting orifice is in the form of an elongated slot having its major lengthwise dimension paralleling the axis of the jaw. The sensing orifice 28 is advantageously similarly elongated and, in the preferred form, the transmitting and sensing orifices have like areas. In order to prevent complete stoppage of flow from either orifice in the event the web contacts the respective guide face 26', a slot such as 26", is formed in the guide faces of the respective jaws to extend from a point inwardly of the orifice preferably to the outer end of the guide face. As shown in FIG. 2, the groove 26" in the jaw 26 is made somewhat wider than its orifice 27 and the groove 25" in the other jaw 25 is similarly proportioned with respect to its orifice 28. Any suitable means such as the pins 31 may be provided for maintaining the jaws 25 and 26 in proper alignment.

The pressure responsive actuator 13 and servovalve 14 are conveniently mounted within the reservoir 17. As shown, the reservoir includes a bottom wall 32, side walls 33 and a removable top wall or cover 34 herein shown in the form of a relatively thick plate. The fluid actuator 13 includes an actuator housing 36 secured as by fasteners 37 to the underside of the cover 34 and a diaphragm 38 which extends across the actuator housing and is sealed to the housing and to the cover 34 by annular seals such as O-rings 39 and 39'. The diaphragm 38 separates the actuator housing into two chambers designated $C_1$ and $C_2$ and, in order to provide a highly sensitive actuator, the diaphragm is preferably formed of a very thin sheet of tough, resilient material, "Mylar," a polyester film having a thickness of the order of .002" being a presently preferred material. Flexing of the thin diaphragm is controlled by preferably resilient reinforcing disks designated 41 and 41' having an outer diameter smaller than the outer diameter of the diaphragm and also preferably formed of a material such as "Mylar" but having a thickness greater than the thickness of the diaphragm as, for example, of about .010".

The servovalve 14 includes a valve casing 45 secured to the actuator housing 36 and having a valve bore 46 therein. The servovalve is conveniently of the spool type and, as shown, the casing has grooves 47a–47e therein communicating with the bore 46 at spaced points therealong. A pressure supply passage 48a communicates with an intermediate one of the grooves 47a and controlled outlet passages 48b and 48c communicate with grooves 47b and 47c at relatively opposite sides of the groove 47a. Return passages 48d and 48e communicate with grooves 47d and 47e respectively and are connected to a return line 51 to return fluid back to the reservoir 17. A movable valve member 55 is disposed in the valve bore and is adjustably connected to the diaphragm 38. As shown, the valve member has spaced annular lands 55b and 55c for valving the flow to the control passages 48b and 48c and end portions 55d and 55e for slidably supporting the valve member in the bore. The lands 55b and 55c preferably have an axial length only slightly greater than the length of the grooves 47b and 47c so as to span the same when the valve member is in its null position shown in FIG. 1. As will be appreciated, when the valve member is moved in either direction from the null position, it will communicate the pressure supply passage 48a with one of the control passages while communicating the other control passage to the respective return passage 48d or 48e. The valve member is adjustably connected to the diaphragm 38 to permit adjustment of the null position of the valve member when the diaphragm is in an undistended condition, and the connection is also preferably arranged to accommodate limited axial and lateral misalignment between the valve member and diaphragm. As shown, the valve member has an externally threaded end portion 55f which is threadedly received in the lower end of a coupling 57, which coupling is secured to the diaphragm by a screw 58 and washer 59. The threads on the end 55f and coupling 57 provide an adjustable connection between the valve member and diaphragm and, preferably, the threads on the coupling are made sufficiently oversize with respect to those on the end 55f as to accommodate limited angular and lateral misalignment between the coupling valve member to avoid applying lateral pressure to the valve member during movement of the diaphragm.

The base 20 for the apparatus is herein shown in the form of an open-ended box-like enclosure having a top wall 61, side walls 62, and a bottom wall 63. The reservoir 17 is mounted on the top wall and extends upwardly from the base. The constant low pressure air generator 11 is conveniently mounted on the underside of the top wall 61 so as to be protectively enclosed in the base. The generator comprises a centrifugal air pump and in the preferred embodiment illustrated, the centrifugal air pump is of the multistage type, it being understood that other forms of centrifugal air compressors could be used. As shown, the centrifugal air pump includes a mounting plate 71 secured as by brackets 72 to the underside of the top wall 61 of the base. An outlet member 73 is secured to the underside of the mounting plate 71 and includes an annular portion 73a and a plate portion 73b which is spaced radially and preferably axially from the annular portion to define air outlet openings 73c therebetween. Ribs or vanes 73d extend between the plate portion 73b and the annular portion 73a to interconnect the same. An impeller shaft 75 is rotatably supported in bearings 76 and 77 in the mounting plate 71 and plate portion 73d respectively, and the centrifugal air pump impellers are mounted on the shaft for rotation therewith. In the preferred embodiment illustrated, the centrifugal air pump is of the multistage type and includes several impellers each designated 78 mounted on the impeller shaft 75 at axially spaced points therealong. Each centrifugal impeller 78 includes front and rear walls 78a and 78b. The front walls 78a of the impellers have a central inlet opening 78c around the shaft, and impeller vanes 78d extend between the front and rear walls and, as is conventional in centrifugal impeller constructions, the vanes preferably curve outwardly and in a direction opposite the direction of rotation of the impellers. The impellers are enclosed in impeller casings each including an inlet wall 85 having a central inlet opening 85a and a marginal wall 85b which surround the impeller peripheries and define an impeller chamber. In the multistage centrifugal air pump illustrated, the impeller casings of the several stages are conveniently arranged to nest as shown in FIG. 1. A stator 88 is provided between the successive pump stages and includes a stator plate 88b spaced from the inlet wall 85 of the second pump stage, and stator vanes 85c which extend between the stator plate and the inlet wall of the next succeeding pump stage to guide air from the outlet of the first stage impeller inwardly to the inlet of the second stage impeller inwardly to the inlet of the second stage impeller and to convert the velocity head on the air at the outlet of the first stage to a pressure head as it enters the second stage. As will be seen, the second stage discharges through the openings 78c into the chamber below the mounting plate 71. The impellers are maintained in proper spaced relation along the shaft by spacers 79 and 80 and are retained on the shaft as by a nut 81. The impeller housings are conveniently sealed to the end member and to the mounting plate 71 as by a resilient annular seal ring 91. An inlet air filter 93 of any suitable construction, for example fiberglass or the like, is mounted to overlie the inlet of the centrifugal air pump and is retained in position thereon as by an annular ring 94 and screen or grid 95. The centrifugal air pump thus has an atmospheric air inlet and an outlet 97, and the centrifugal air pump is operable when driven at a substantially constant speed to deliver substantially constant low pressure air to the outlet and to maintain the pressure constant, notwithstanding variations in flow rate as occur during operation of the sensing apparatus. The centrifugal air pump is preferably constructed and arranged to provide a relatively low pressure, for example, of the order of about 5" water column (about 1/5 p.s.i.), and the diameters of the impellers, the number of stages and the speed of rotation of the pump are selected accordingly. For example, for the above-described pressure of about 5" of water column, it has been found satisfactory to use a two-stage centrifugal air pump having impellers with an outer diameter of about 5½" and driven at a speed of about 6,000 r.p.m. As a convenience in connecting the centrifugal air pump outlet to the sensing apparatus, the outlet is connected through a fitting 97a, conduit 98 and fitting 99 to a small chamber 100 in the top 34 of the reservoir, hereinafter sometimes referred to as the pump outlet chamber.

Unlike a positive displacement compressor, the centrifugal air pump does not require lubrication such as oil or graphite. Further, since the centrifugal air pump directly generates the desired low pressure, it effectively avoids the water condensation problem normally incident to compressing the air, as occurs in the prior high pressure systems having pressure regulators to produce the low operating pressure.

Hydraulic fluid under pressure is supplied to the valve from an hydraulic pump 101 conveniently mounted in the base 20. The hydraulic pump can be of any conventional construction suitable for producing the desired operating pressure and may, for example, be of the gear type shown including intermeshing gears 102 and 103 having inlet and outlet passages 104a and 104b at relatively opposite sides of the mesh point. The gear pump has a drive shaft 105 herein shown connected through a coupling 106 to the shaft 107 of the drive motor 18. The motor 18 is conveniently mounted on the top 61 of the base, and its shaft 107 extends through the base for connection to the hydraulic pump. The motor 18 is also conveniently employed to drive the centrifugal air pump and, for this purpose, a pulley 109 on the shaft 107 is connected through a belt 111 to an air pump drive pulley 112 on the impeller shaft 75. The pulley diameters are, of course, selected to drive the centrifugal air pump at the desired speed.

The pump inlet 104a is connected through a tube 121 conveniently extending through a fitting 122 in the top wall 34 of the reservoir and through a tube 123 to an inlet filter 124 immersed in the fluid in the reservoir. The pump outlet 104b is connected through a tube 125, fitting 126 and tube 127 to a relief valve 128 that discharges back to the reservoir, and is also connected through a filter 129 that communicates with the pressure supply passage 48a in the servovalve. The relief valve 128, as is conventional, is arranged to open when the pressure in the system reaches a preselected maximum value, for example 300 p.s.i., and to prevent buildup of pressure substantially above this maximum value. The filter 129 can be of any conventional construction suitable for removing any foreign particles in the hydraulic system to prevent entrance of the same into the servovalve or motor. The control passages 48b and 48c of the servovalve are connected through tubes 131 and 132 which extend through fittings 133 and 134 in the top wall to preferably flexible tubes 135 and 136 that extend to the remote servomotor 15. As diagrammatically shown in FIG. 1, the servomotor is of the linear actuator type including a cylinder 137 and a piston 138 and the hydraulic lines 135 and 136 are connected to the cylinder to communicate therewith at relatively opposite sides of the piston to reversibly actuate the same.

The outlet of the constant pressure generator 11 is connected to the transmitting orifice 27 of the sensing head through a conduit 141 having one end connected through a fitting 141a to the passage 29 in the sensing head and the other end connected through a fitting 141b to the pump outlet chamber 100. The conduit 141 is preferably proportioned so as to provide substantially unrestricted flow of air from the air pump outlet to the transmitting orifice and, for this purpose, is formed with a large internal cross section, for example, one-half square inch in diameter, so that the conduit imposes negligible impedance to the flow of air at the relatively low rates (generally less than one cubic foot per minute) which occur in the system. The air supplied through conduit 141 to the transmitting orifice is discharged from the latter in a first stream extending crosswise of the path of travel of the web W toward the sensing orifice 28. The sensing orifice 28 is connected to one of the chambers in the actuator 13, preferably the chamber $C_2$, to transmit pressure variations at the sensing orifice to the actuator. As shown, a preferably flexible tube 144 has one end connected by a fitting 144a to the passage 30 in the sensing head and the other end connected through a fitting 144b to a passage 146 in the cover 34. A tube 148 has one end connected through a fitting 148a to the passage 146 and the other end connected through a fitting 148b to the pressure chamber $C_2$. The passage 30 and tubes 144 and 148 together form a second conduit means connecting the sensing orifice 28 to the sensing chamber $C_2$ in the actuator 13 so that the diaphragm can respond to the pressure variations at the sensing orifice. For reasons pointed out hereinafter, the fitting 148b at the actuator end of the second conduit means is preferably located outwardly of the center of the diaphragm adjacent the outer periphery of the reinforcing disk 41'. Pressurized air is also supplied to the sensing orifice 28 to deliver a relatively lower velocity stream therefrom. In the preferred embodiment, air from the pump outlet chamber is passed through a fitting 151 having a flow restrictor 152 therein and through a third conduit means 153 to a fitting 154 communicating with the chamber $C_2$ also preferably at a point outwardly of the center of the diaphragm and adjacent the outer periphery of the reinforcing disks 41' but at the side of the valve member generally opposite the fitting 148b so that air flowing from the pump outlet through flow restrictor 152 and conduit 153 passes into the chamber $C_2$ at one point, then through at least a major portion of the chamber $C_2$ and out through the second conduit means to the sensing orifice. The tubes 148 and 144 are preferably proportioned so as to provide substantially unrestricted flow of air to the sensing orifice and are accordingly formed with a relatively large cross section, for example ½" in diameter.

The flow restrictor 152 is formed with an orifice which is small as compared to the size of the sensing orifice 28 so that the pressure and hence the velocity of the stream issuing from the sensing orifice is low in comparison to the velocity of the stream issuing from the transmitting orifice 27. For example, in a sensing head having a sensing orifice with an area of approximately .031 square inch, the flow restrictor 152 is formed with an orifice of approximately .012 square inch, or about one-third the size of the sensing orifice. The transmitting orifice is preferably formed with a flow area approximating that of the sensing orifice which, in the above example, would be about .031 square inch.

The jet of air from the transmitting orifice 27 impinging upon the lower velocity air jet emitted from the sensing orifice 28 produces a back pressure at the sensing orifice which is applied through the second conduit means including tubes 144, 148 to the pressure chamber $C_2$. This maintains an above-atmospheric pressure in chamber $C_2$. A counterforce is applied to the diaphragm to counteract the normal pressure unbalance in chamber $C_2$. While this could be in the form of a pneumatic pressure applied to chamber $C_1$, it has been found that the centrifugal air pump maintains a sufficiently constant pressure differential between its atmospheric air inlet and its outlet, that the chamber $C_1$ can be vented to atmosphere through an atmospheric vent herein shown as a passage 175 which extends upwardly from the chamber $C_1$ and then laterally to open at the side of the top wall 34. A counterbalancing spring 176 is interposed between the diaphragm and an adjustable screw 177 to enable adjustment of the counterbalancing pressure applied to the diaphragm and valve member.

The steering roll assembly 21 can be of any conventional construction and is herein shown of the type disclosed in the copending application of Robert W. Ott, Jr., Ser. No. 530,074 filed Feb. 25, 1966, for "Web Guide Apparatus." In general, the steering roll assembly includes one or more web engaging rollers 181 supported by bearings 182 in a movable support structure 183. Guides in the form of arcuate rails 184 and followers 185 movably mount the support structure 183 on a stationary support structure 186. The rails 184 are arcuate and have a common center to support the movable support structure and the rollers for movement in an arcuate path about that center, and the servomotor 15 has its piston 138 and cylinder 137 operatively connected to the stationary support structure and to the movable support structure to move the latter along the arcuate rails 184 in a direction and magnitude to shift the travelling web in a direction to compensate for any deviation from the desired web path.

The centrifugal air pump, operated at a generally constant speed, produces a substantially constant outlet pressure over a wide range of air flows. This enables the use of a relatively large diaphragm as shown at 38 for the pressure actuator to provide adequate power for moving the servovalve, without sacrificing speed of response in the pneumatic sensing portion of the control apparatus. Stated otherwise, that movement of the diaphragm which is required to operate the servovalve from its null position to either flow position, effectively displaces a volume of air in the sensing chamber $C_2$ and the larger the diaphragm, the larger will be the volume displaced. However, the centrifugal air pump has a relatively large flow capacity and can rapidly compensate for the changes in effective volume of chamber $C_2$ due to movement of the diaphragm, while yet maintaining a substantially constant air pump outlet pressure. The large diaphragm provides adequate power for moving the servovalve so that it is not necessary to dither the servovalve. Moreover, by avoiding dithering of the servovalve, the amount of overlap between the lands and grooves in the valve can be minimized so as to minimize the amount of travel of the valve and diaphragm required to move the valve from its null position to either of its flow positions. This, in turn, improves the sensitivity and speed of response of the hydraulic portion of the control apparatus.

From the foregoing, it is thought that the operation and construction of the device will be readily understood. The valve member 55 of the servovalve is adjusted relative to the diaphragm, by turning the valve member relative to the coupling 57 until the valve member is in its null position shown in FIG. 1 when the diaphragm is substantially undistended. When the motor 18 is operated to drive the centrifugal air pump, the air pump produces substantially constant low pressure air which is delivered substantially unrestricted through the conduit 141 to the transmitting orifice 27. A restricted flow of air from the centrifugal air pump is transmitted through flow restrictor 152, conduit 153 to the diaphragm $C_2$ and through conduits 148 and 144 to the sensing orifice 28. The sensing apparatus is preferably adjusted so as to maintain the servovalve in its null position when the web partially intersects the streams of air issuing from the transmitting and sensing orifices 27 and 28, and the pressure applied to the diaphragm by the compensating spring 176 is accordingly adjusted by screw 177 with a web in a mid-position as shown in FIG. 1, to compensate for the pressure condition in the chamber $C_2$ under these conditions. When the web W moves away from the mid-position and out of the opposing streams from the transmitting and sensing orifices, the relatively stronger streams of air from the transmitting orifice causes greater resistance to flow of air from the sensing orifice and produces a resultant pressure increase in the sensing orifice which is reflected back to the chamber $C_2$ to move the valve member 55 upwardly. As the valve member 55 moves upwardly, hydraulic fluid under pressure is passed from the pressure supply passage 48a through the control passage 48c to cause the steering roll assembly to move to the right as viewed in FIG. 1. This tends to shift the travelling web to the right and move the same back into the streams of air from the transmitting and sensing orifices until the pressure in the chamber $C_2$ drops and allows the valve to move back to its null position. On the other hand, if the web moves to the right from the mid-position shown in FIG. 1 and further interrupts the flow of air from the transmitting to the sensing orifice, the pressure at the sensing orifice will decrease, and this pressure change is reflected through the conduits 144, 148 to the sensing chamber $C_2$. The valve member then moves downwardly and supplies fluid under pressure to the control port 148b to move the steering roll to the left as viewed in FIG. 1 to correct the deviation of the web.

It has been found that the speed of response of the system is markedly improved by minimizing the volume of the chamber $C_2$ and by passing the air for the sensing head through the chamber $C_2$ to the sensing head. For this reason, the fittings 149, 154 are disposed at spaced points in the chamber so that the air from the outlet of the air pump will flow through at least a substantial portion of the chamber $C_2$.

What is claimed as new is:

1. A web edge sensing and control apparatus for actuating a servomotor comprising, valve means for controlling the flow of fluid to said servomotor, pressure chamber means having a movable wall connected to said valve means for operating the same, a web edge sensing head having a sensing orifice and a discharge orifice mounted in spaced opposed relation to receive a web edge therebetween, a centrifugal air pump having an atmospheric air inlet and an outlet, motor means for driving said centrifugal air pump at a substantially constant speed to maintain a preselected substantially constant air pressure at said outlet, a first conduit means connecting said outlet to said discharge orifice for passing a relatively unrestricted flow of air from said outlet to the discharge orifice for flow from the latter in a first stream directed toward said sensing orifice, a second conduit means connecting said sensing orifice to said pressure chamber, third conduit means communicating with said first and second conduit means and having a flow restrictor therein for passing a relatively restricted flow of air from the first conduit means to the second conduit means to flow from the sensing orifice in a second stream having a relatively lower velocity than said first stream, said first stream being adapted to impinge on said second stream whereby a web edge intersecting the first stream modulates the pressure on the second stream issuing from the sensing orifice and correspondingly varies the pressure in said pressure chamber.

2. An apparatus according to claim 1 wherein said centrifugal air pump is of the multistage type including at least two axially aligned centrifugal impellers and a stationary diffuser for passing air from the outlet of one impeller to the inlet of the next impeller.

3. An apparatus according to claim 1 wherein said third conduit means communicates with first conduit means adjacent said outlet of said air pump and through said pressure chamber with said second conduit means.

4. An apparatus according to claim 1 including a reservoir and an hydraulic pump for pumping hydraulic fluid from the reservoir to said valve means, said motor means including means drivingly connecting the same to said hydraulic pump.

5. A web edge sensing and control apparatus for actuating a servomotor comprising valve means for reversibly controlling the flow of hydraulic fluid to said servomotor and including a valve casing and a valve member movable in said casing, a valve actuator including a diaphragm connected to sid valve member and housing means defining a pressure chamber at one side of said diaphragm, a web edge sensing head having a sensing orifice and a discharge orifice mounted in spaced opposed relation to receive a web edge therebetween, a centrifugal air pump having an atmospheric air inlet and an outlet, motor means for driving said centrifugal air pump at a substantially constant speed to maintain a preselected substantially constant air pressure at said outlet, a first conduit means connecting said outlet to said discharge orifice for passing a relatively unrestricted flow of air from said outlet to said discharge orifice for flow from the latter in a first stream directed toward said sensing orifice, a second conduit means connecting said sensing orifice to said pressure chamber at a location in the housing means, a third conduit means connecting said pump outlet to said pressure chamber at a second location in the housing means spaced from said one location such that air from said third conduit means entering the pressure chamber at said second location flows through the pressure chamber before passing to said second location and out through said second conduit means, flow restrictor means in said third conduit means for passing a relatively restricted flow of air from the pump outlet to said pressure chamber and sensing orifice to flow from the latter in a second stream having a relatively lower velocity than said first stream, said discharge orifice being arranged to direct said first stream toward said sensing orifice to modulate the pressure at the sensing orifice in accordance with the position of a web edge intersecting said first stream.

6. An apparatus according to claim 5 wherein said flow restrictor has a flow area that is small as compared to the flow area of said sensing orifice.

7. An apparatus according to claim 5 wherein said centrifugal air pump is of the multistage type and includes a plurality of axially aligned centrifugal impellers and a stationary diffuser for passing air from the outlet of one impeller to the inlet of the next impeller.

8. An apparatus according to claim 5 wherein the other side of said diaphragm is vented to atmosphere.

No references cited.

EDGAR W. GEOGHEGAN, *Primary Examiner.*